3,375,262
MONOACYL DIOL HYDROGEN DICARBOXYLATES
James Bruce Martin, Hamilton, Ohio, assignor to The Procter & Gamble Company, Cincinnati, Ohio, a corporation of Ohio
No Drawing. Filed Oct. 29, 1963, Ser. No. 319,643
4 Claims. (Cl. 260—404.8)

This invention relates to new organic compounds and more particularly to new and novel monoacyl diol hydrogen dicarboxylates having utility as additives for bakery products such as bread, cakes, pies, doughnuts, icings, fillings, and the like products prepared from emulsions comprising water, fat, protein, and/or carbohydrates.

The volume, texture, and eating qualities of many bakery products are dependent upon the interaction of various ingredients during the mixing operation in which a dough, batter, or other emulsion is formed and the subsequent baking and/or storage of said bakery product. In accordance with the invention, a new group of edible organic compounds has been discovered which can be incorporated in bakery products for the improvement of volume, texture, and eating qualities. The compounds of this invention are the monoacyl diol hydrogen dicarboxylates which are the half esters of dicarboxylic acid containing from 4 to 6 carbon atoms and fatty acid monoester of straight chain aliphatic diol, said diol containing from 3 to 6 carbon atoms and said fatty acid having from 12 to 22 carbon atoms.

The new compounds of this invention are prepared by an esterification reaction between monoacyl diol ester and dicarboxylic acid anhydride. In a typical example, propylene glycol monostearate was reacted with succinic anhydride in a 1:5 molar ratio in seven times their combined weight of xylene. The mixture was heated under reflux for one hour while being stirred. The hot reaction product was then poured into five volumes of cold water. The xylene phase was separated, washed three times with an equal volume of water, dried with anhydrous sodium sulfate, and cooled to 0° F. The precipitate which formed was recrystallized from 20 parts by weight hexane at 40° F. The crystallized product was then dried in a vacuum desiccator. The crystallized product, stearoyl propylene glycol hydrogen succinate, had a white, needlelike appearance and a complete melting point of 62.6° C. It had an acid value of 125.2 and a saponification value of 376 which compared favorably with the calculated acid value of 126.9 and saponification value of 381.

Reactions were carried out similarly with succinic anhydride and various other monoacyl diol esters of the class described herein. The following table records the analytical values for various succinic acid half esters prepared by these reactions.

TABLE I

| Compound* | Complete Melting Point | Acid Value | | Saponification Value | |
|---|---|---|---|---|---|
| | | Found | Calc'd | Found | Calc'd |
| M-HD-HS | 57.5 | 130.4 | 131.0 | 387 | 392 |
| S-PD-HS | 76.4 | 124.2 | 126.9 | 376 | 381 |
| S-BD-HS | 72.4 | 121.5 | 123.0 | 367 | 369 |
| S-HD-HS | 68.6 | 113.1 | 115.9 | 344 | 348 |
| B-PG-HS | 72.1 | 108.1 | 112.6 | 328 | 338 |
| B-PD-HS | 79.3 | 115.9 | 112.6 | 344 | 338 |
| B-HD-HS | 71.7 | 105.0 | 103.8 | 317 | 311 |

*First letter in these abbreviations refers to the fatty acid component, i.e., M=myristoyl, S=stearoyl, B=behenoyl; Middle two letters refer to the diol component, i.e., PG=propylene glycol, PD=1,3-propanediol, BD=1,4-butanediol, HD=1,6-hexanediol; Last two letters, HS, refer to hydrogen succinate.

The corresponding glutaric, diglycolic, and adipic acid half esters are prepared by substituting an equivalent amount of the appropriate dicarboxylic acid anhydride for the succinic acid anhydride in the above reaction. As another specific example, stearoyl-1,3-propanediol hydrogen glutarate was prepared by refluxing 1,3-propanediol monostearate with glutaric anhydride in a 1:2 molar ratio in 3 times their combined weight of xylene. The product was recovered by water washing in xylene, followed by crystallizing from the xylene extract combined with twice its volume of hexane at a temperature of 0° F. The product was then recrystallized from 20 volumes of hexane at 70° F., with a yield of 85%. The product was a fine, white crystalline powder having a complete melting point of 67.0° C. It had an acid value of 119 and a saponification value of 364 which compared favorably with the calculated acid value of 123 and saponification value of 369.

Alternatively, the reaction between the monoacyl diol esters and the cyclic anhydride can be carried out at temperatures of from about 10° C. (50° F.) to about 50° C. (122° F.) in solvents such as chloroform, benzene, and ethyl acetate using a catalytic quantity of perchloric acid (50% to 70% aqueous solution). The isolation procedure is the same as in the above esterification method.

The new compounds of this invention can be used in shortenings for improving the volume of cakes. For example, 0.5% by weight of stearoyl propylene glycol hydrogen succinate employed in a standard plastic shortening consisting of partially hydrogenated vegetable oil (soybean and cottonseed oils in weight ratio of 85:15) having an iodine value of about 75 increased the volume of a standard quick method white layer cake containing about 10% by weight shortening from 985 cc. to 1100 cc./400 g. batter. The cakes were prepared according to the following formula.

| Ingredients: | Weight in grams |
|---|---|
| Cake flour | 107 |
| Granulated sucrose | 133 |
| Sodium chloride | 2.5 |
| Double-acting baking powder | 6.8 |
| Shortening | 47.5 |
| Whole milk | 90 |

(Mix for 2 minutes on a conventional household mixer at 500 r.p.m.)
Add:
 Fresh egg white _____ 60
 Whole milk _____ 40
 (Mix additional 2 minutes at 500 r.p.m.)
Scale 8-inch pans at 400 g. batter.
Baking temperature, 365° F.
Baking time, 25 minutes.
Cake volume measured 20 minutes after removal from oven.

When stearoyl propylene glycol hydrogen glutarate and stearoyl propylene glycol hydrogen adipate are substituted for the stearoyl propylene glycol hydrogen succinate in the shortening of the above cake, substantially similar improvement in cake volume is obtained in comparison with the above standard plastic shortening which does not contain the monoacyl diol hydrogen dicarboxylate additive.

The above plastic shortening containing 0.5% by weight stearoyl propylene glycol hydrogen succinate also had a very desirable smoke point of 405° F. This compared favorably with the 365° F. smoke point of a standard commercially available all-purpose plasticized vegetable oil shortening containing conventional mono- and diglyceride emulsifiers. The smoke point was determined according to A.O.C.S. standard method Cc9a-48. An open cup (for flash and fire test) was filled to the meniscus marker with fat at approximately 50° C. The fat sample was heated rapidly to within 75° F. (24° C.) of the smoke point; and then the flame was regulated so that the temperature of the oil increased 10°±1° F.

(5.55°±0.555° C.) per minute. The smoke point was taken as the temperature at which the fat gave off continuously a thin bluish smoke. In view of its high smoke point, the improved shortening of this invention containing the stearoyl propylene glycol hydrogen succinate is suitable for general purpose frying.

The compounds of this invention also are effective high temperature batter stabilizers for cake batter systems containing alpha-phase crystal-tending emulsifiers, such use being described in the co-pending applications of Howard, U.S. Ser. No. 107,631, now Patent No. 3,145,107, Ser. No. 107,632, filed May 4, 1961, and Ser. No. 182,955, now Patent No. 3,145,109.

Improved cream icings using liquid shortenings can also be obtained with the new compounds of this invention. For example, the density of a standard cream icing employing 17% by weight cottonseed oil liquid shortening containing 1% by weight stearic acid was reduced from 1.24 to 0.96 g./cc. when 3% by weight stearoyl propylene glycol hydrogen succinate was incorporated in the shortening. The icing was prepared according to the following formula:

| Ingredients | Weight in grams |
|---|---|
| Shortening | 88 |
| Non-fat dry milk solids | 21 |
| Sodium chloride | 2 |
| Powdered sucrose | 335 |
| Water | 59 |

All ingredients were combined in a 2-quart mixing bowl and mixed with a paddle for 5 minutes on a conventional laboratory mixer at 144 r.p.m. After scraping down the sides of the bowl with a spatula, mixing was continued for another 10 minutes at 258 r.p.m.

When behenoyl propylene glycol hydrogen glutarate, oleoyl propylene glycol hydrogen succinate, and myristoyl-1,6-hexanediol hydrogen succinate are substituted for the stearoyl propylene glycol hydrogen succinate in the above shortenings, substantially similar improvements in shortening properties are obtained.

The monoacyl diol hydrogen dicarboxylates of this invention when used in cake baking can be added directly to the cake batter system during the mixing step but preferably are pre-mixed with the shortening component of the batter. These compounds also can be used in dry cake mixes as a separate dry ingredient or as an ingredient in the shortening component of the dry mix. They are preferably used for cake baking and for other shortening-containing foods in an amount of from about 0.1 to about 8% by weight of the shortening.

Dry cake mixes embodying the concept of the invention may be formulated for any of a variety of types, such as yellow, white, chocolate, devil's food, marble, spice, coconut, banana, lemon, burnt sugar, cherry, mint, pound cakes, and so on. The following examples illustrate yellow and chocolate type cakes, respectively, all proportions by weight.

*Yellow type cake*

| Ingredients | Percent |
|---|---|
| Sugar | 35–50 |
| Flour | 35–50 |
| Shortening | 9–15 |
| Non-fat dried milk solids | 0.5–5.0 |
| Salt | 0.5–2.0 |
| Leavening | 1.0–4.0 |
| Egg solids | 0–5.0 |
| Flavoring (including spices) | 0.1–5.0 |
| Coloring, minor amount, if any. | |

*Chocolate type cake*

| Ingredients | Percent |
|---|---|
| Sugar | 35–40 |
| Flour | 25–40 |
| Shortening | 9–15 |
| Non-fat dried milk solids | 0.5–3.0 |
| Leavening | 1.0–4.0 |
| Cocoa | 4.0–8.0 |
| Salt | 0.5–2.0 |
| Flavoring | 0.1–1.0 |
| Coloring, minor amount, if any. | |

Icings embodying the concept of the invention may be formulated for any of a variety of types, such as chocolate, vanilla, creamy, fluffy, and so on. The following example illustrates a chocolate type icing, all proportions by weight.

*Chocolate type*

| Ingredients | Percent |
|---|---|
| Water | 10–25 |
| Sugar | 45–75 |
| Shortening | 5–30 |
| Salt | 0.1–1.0 |
| Non-fat dried milk solids | 1–5 |
| Cocoa | 5–10 |
| Flavoring | 0.1–2 |

The term "shortening" is used herein to define any of the conventional edible glycerides derived from animal, vegetable or marine fats and oils. These fats and oils such as cottonseed oil, rapeseed oil, soybean oil, coconut oil, palm oil, peanut oil, sesame seed oil, sunflower oil, safflower oil, sardine oil, lard and tallow, generally comprise triglycerides containing higher fatty acid radicals having from about 12 to about 22 carbon atoms. The shortening can be solid, semi-fluid, and liquid in physical structure and can contain minor amounts of conventional shortening additives such as the mono- and diglycerides of the higher fatty acids.

The dry cake mixes and cake batters in which the compounds of this invention are employed can contain any of the conventional cake ingredients, such, for example, as flour, sugar, salt, protein matter such as milk solids and egg white, starch, flavoring, coloring and the above-mentioned shortenings. The icings can contain any of the conventional icing ingredients such as sugar, protein, flavoring, coloring, and the above-mentioned shortenings.

What is claimed is:
1. Stearoyl propylene glycol hydrogen succinate.
2. Behenoyl propylene glycol hydrogen succinate.
3. Stearoyl propylene glycol hydrogen glutarate.
4. Behenoyl propylene glycol hydrogen glutarate.

References Cited

UNITED STATES PATENTS

| | | | |
|---|---|---|---|
| 3,293,272 | 12/1966 | Freund | 260—404.8 |
| 1,980,441 | 11/1934 | Salzberg | 260—404.8 X |
| 2,343,434 | 3/1944 | Wells et al. | 260—404.8 X |

ALEX MAZEL, *Primary Examiner.*

CHARLES B. PARKER, *Examiner.*

A. H. SUTTO, R. J. GALLAGHER, *Assistant Examiners.*